United States Patent [19]
Hundt

[11] Patent Number: 4,998,224
[45] Date of Patent: Mar. 5, 1991

[54] SYSTEM FOR PROVIDING IMPROVED REVERBERATION LIMITED SONAR PERFORMANCE

[75] Inventor: Michael M. Hundt, Old Lyme, Conn.

[73] Assignee: The United States of America as represented by the Secretary of the Navy, Washington, D.C.

[21] Appl. No.: 700,984

[22] Filed: Oct. 1, 1984

[51] Int. Cl.⁵ ............................................. G01S 15/00
[52] U.S. Cl. .................................. 367/100; 367/101
[58] Field of Search .................... 367/87, 90, 100, 101, 367/102

[56] References Cited

U.S. PATENT DOCUMENTS 3,519,985 7/1970 Page ....................................... 367/90
4,047,172 9/1977 Bauer et al. ........................... 367/101

Primary Examiner—Thomas H. Tarcza
Assistant Examiner—Daniel T. Pihulic
Attorney, Agent, or Firm—Michael J. McGowan; Prithvi C. Lall

[57] ABSTRACT

Apparatus and method for providing increased gains in detection and classification of active sonar targets while concurrently preventing target cognizance of detection. Operation starts with transmission of a sequence of FM slides as subpulses alternately up slide, down slide, up slide, etc., while varying randomly the start frequency of each. Subpulse lengths short enough to avoid overlap of echoes from multiple major reflectors are used. Each slide is started at a randomized frequency. Just enough bandwidth is used on each slide to achieve the range resolution desired for searching. Considering only the individual subpulse bandwidth, subpulses are transmitted throughout the systems total bandwidth. Enough subpulses are transmitted to achieve the bandwidth-/time product desired for searching.

5 Claims, 5 Drawing Sheets

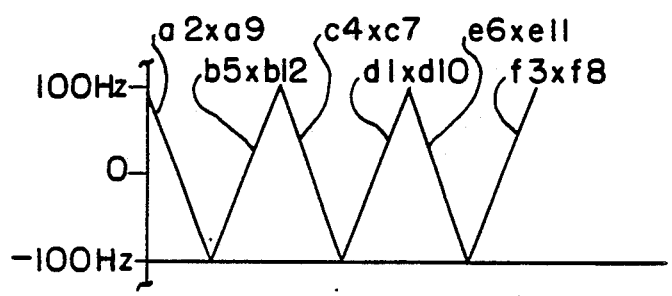
F I G. 9
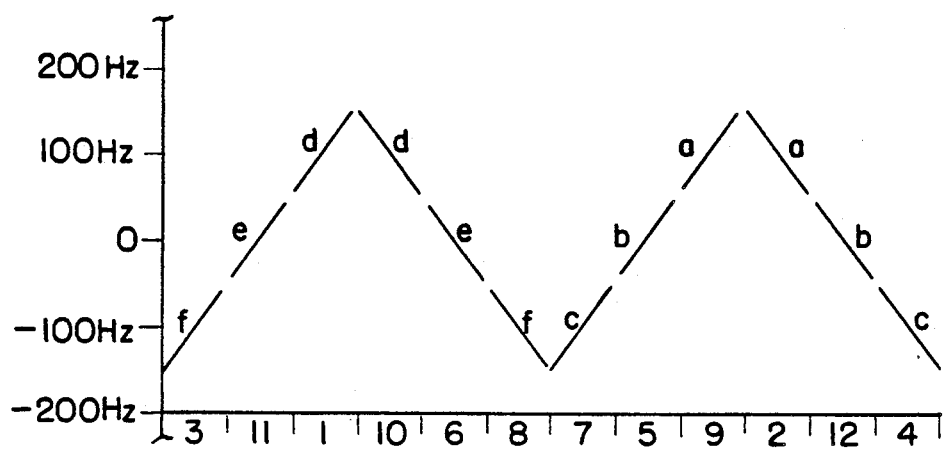
F I G. 10
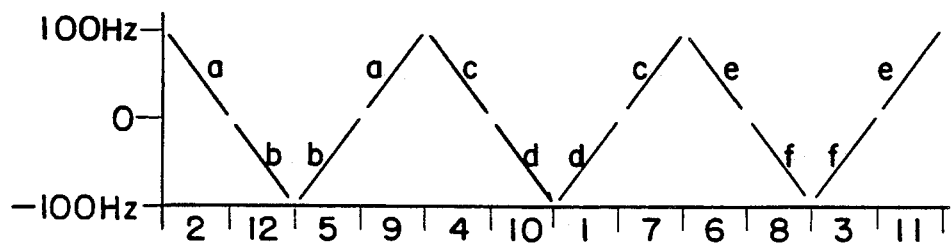
F I G. 11

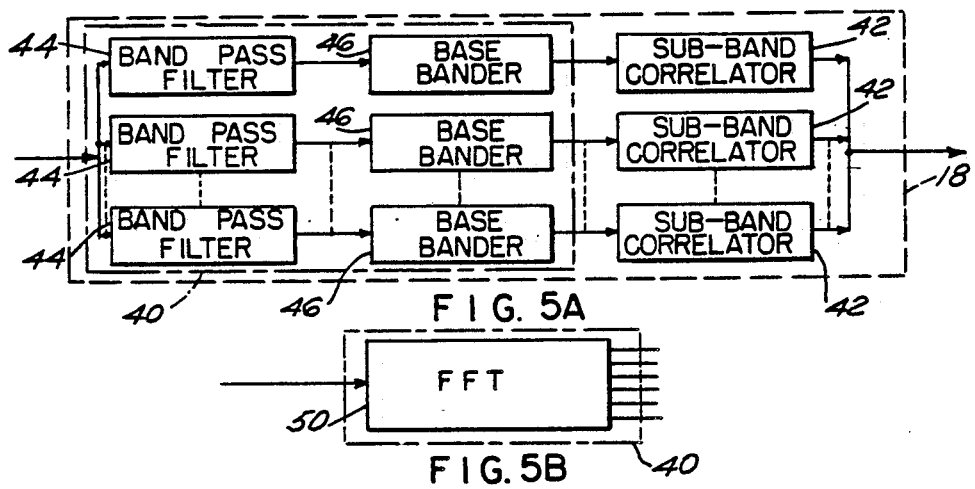
FIG. 5A
FIG. 5B
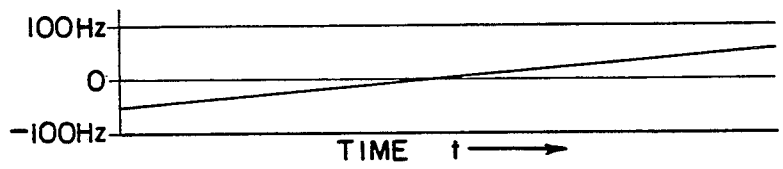
FIG. 6A
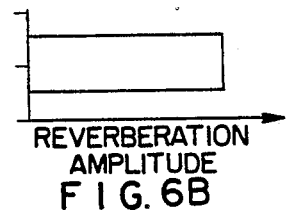
FIG. 6B
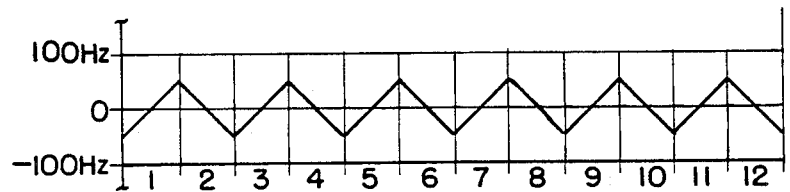
FIG. 7A
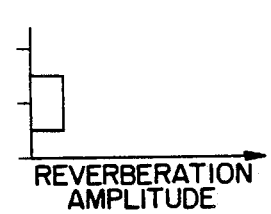
FIG. 7B
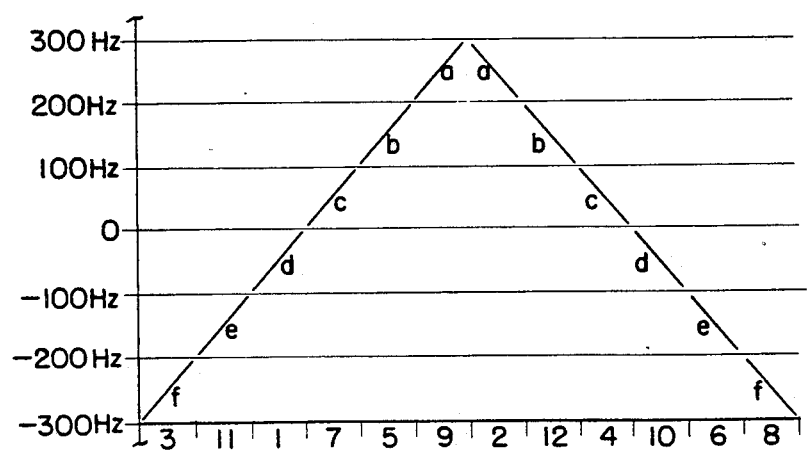
FIG. 8A
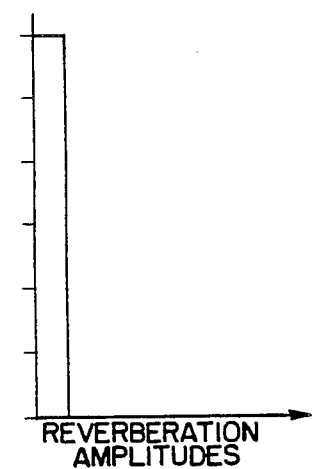
FIG. 8B

SYSTEM FOR PROVIDING IMPROVED REVERBERATION LIMITED SONAR PERFORMANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to sonar signal processing and more particularly to an active sonar waveform transmission and receiver processing system which improves performance by: reducing the effects of reverberation, improving active classification without requiring a unique transmission which could "alert" the target, reducing the effects of Mutual Interference (MI) and improving immunity to ping stealing by enemy submarines, thereby achieving greater performance in all these areas concurrently. Mutual Interference is caused by a transmission of one ship sonar system being received unintentionally by another ships system. Consorts in the same area find this to be a common problem which causes both marking and blanking of displays. Ping stealing is a function carried out by a target to derive information about the course, speed, mode, depth, etc., of the ship or submarine whose transmissions are being received and analyzed.

2. Description of the Prior Art

Current active sonar transmission/reception techniques all have drawbacks in one performance area or another. Improvement in a selected area requires compromised or reduced performance in other areas. Present techniques however do not permit improvement in all areas simultaneously. For example, although widening the transmitted FM bandwidth of a pulse reduces reverberation, it also causes separating of the target into individual lower strength reflectors thus causing increased "splitting losses", and reduced immunity to MI and ping stealing. Currently Frequently Shift Keying (FSK) employs subpulses of longer than 100 ms with subpulse frequency separation set in a geometric pattern. Using Frequency Shift Keying (FSK) with typical Continuous Waveform (CW) subpulses degrades range resolution/ classification and produces higher reverberation than that due to FM. Also, all FM, CW and FSK transmissions currently used for long range search or classification experience signal-to noise reduction due to overlapping returns from the major reflectors of a target, most of which are spaced within 100 ms.

SUMMARY OF THE INVENTION

Accordingly, it is a general purpose and object of the present invention to provide an improved, reverberation limited sonar system.

It is a further object that such system improve active target classification without alerting the target.

Another object is to reduce the effects of Mutual Interference.

A still further object is to improve immunity to ping stealing.

A still further object is that all the above objects are accomplished concurrently.

These objects are achieved with the present invention by means of a system for providing increased gains in detection and classification of active sonar targets while concurrently preventing target cognizance of detection. Operation starts with transmission of a sequence of FM up slide/down slide subpulse pairs, while randomly varying the start frequency of each subpulse. Subpulse time lengths short enough to avoid overlap of echoes from multiple major reflectors are used. Just enough bandwidth is used on each slide to achieve the range resolution desired for searching. Considering only the individual subpulse bandwidth, subpulses are transmitted throughout the systems total bandwidth. Enough subpulses are transmitted to achieve the band-width/time product (WT) desired for searching.

A more complete understanding of the invention and many of the attendant advantages thereto will be readily appreciated as the same becomes better understood by reference to the following detailed description when considered in conjunction with the accompanying drawings wherein:

BRIEF DESCRIPTION OF THE DRAWINGS (U)

FIG. 5A shows a more detail block diagram implementation of the search Doppler range blocks of FIG. 4.

FIG. 5B shows an alternate FFT implementation for the search Doppler range blocks of FIG. 4.

FIG. 6A shows a 100 Hz basebanded version of transmit pulse "f" of FIG. 1A.

FIG. 6B shows the corresponding reverberation level for the transmit pulse of FIG. 6A.

FIG. 7A shows the basebanded 100 Hz transmit subpulses a-f of FIG. 3A.

FIG. 7B shows the corresponding reverberation level for the basebanded pulses of FIG. 7A.

FIG. 8A shows the spectrum covering subpulses of FIG. 3A reordered as shown to produce a classify signal.

FIG. 8B shows the corresponding reverberation level for the waveforms of FIG. 8A.

FIG. 9 shows a waveform based on the cross products of the subpulses of FIG. 3A.

FIG. 10 shows an alternate subpulse arrangement to that of FIG. 8A.

FIG. 11 shows a second alternate subpulse arrangement to that of FIG. 8A.

DESCRIPTION OF THE PREFERRED EMBODIMENTS

Figure 1A:
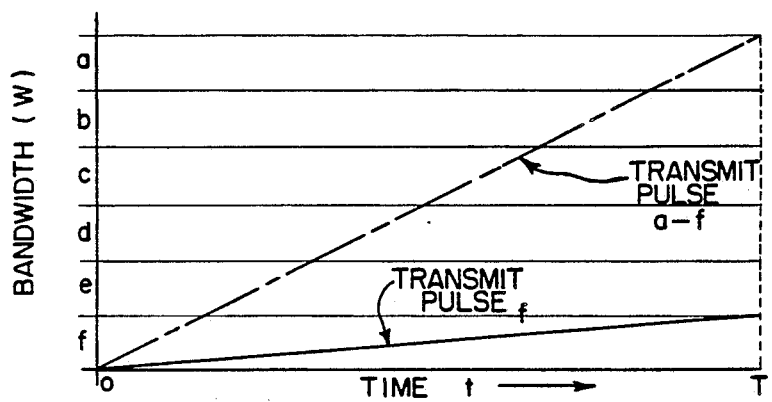
FIG. 1A shows a graph of typical FM transmit pulses
Figure 1B:
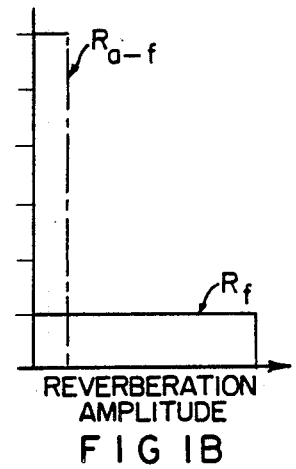
FIG. 1B shows the corresponding reverberation levels due to the transmit pulses of FIG. 1A.

Referring now to FIGS. 1A and 1B there is shown a graph of bandwidth vs time where the total bandwidth (W) chosen to achieve high resolution for classification is subdivided into a preselected plurality of N contiguous subbandwidths; e.g. the six subbands "a–f" shown in FIG. 1A. In one case, an FM slide pulse is transmitted for a preselected long time interval T over a typical subbandwidth such as "f". Here, time T is chosen based on the transmit energy necessary to produce desired high echo amplitudes from long range targets while subbandwidth "f" is chosen for desired target resolution which is defined as 1/W. While moderate resolution and high echo pulse amplitude is achieved, pulse "f" also produces the unacceptably high reverberation amplitude $R_f$ of FIG. 1B. Alternately, a long FM slide pulse "a–f" covering total bandwidth W, transmitted for time T, produces low reverberation amplitude $R_{a-f}$. The increase in bandwidth from f to a-f however also produces high resolution which splits the target into echo signal components with lower amplitudes thus reducing or preventing detectability over background noise.

Figure 2A:
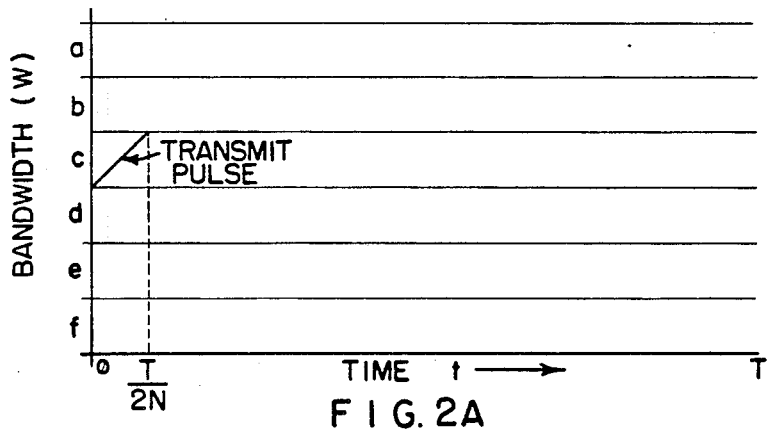
FIG. 2A shows a graph of a shorter time length transmit pulse for frequency band "c" of FIG. 1A.
Figure 2B:
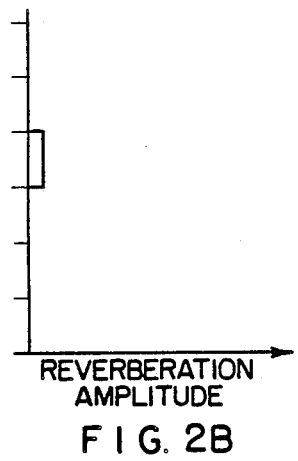
FIG. 2B shows the corresponding lower reverberation level for the transmit pulse of FIG. 2A.

FIGS. 2A and 2B show a pulse "c" of much shorter transmit time T/2N than, but having the same subbandwidth as, pulse "f" of FIG. 1A. The subpulse of FIG. 2A, while producing a significantly lower level of reverberation, exhibits a low amplitude echo signal which may not rise enough above the noise level to be detectable.

What is desired is low bandwidth so as not to over-resolve the target and a shorter transmit pulse time to lower reverberation levels. However as pulse energy is lowered by shortening transmit pulse time, the amplitude of the echoes from target reflectors is correspondingly lowered. The present invention provides a transmit sequence, comprising a plurality of FM subpulses transmitted according to a preselected frequency/time sequence which is used in conjunction with two concurrent receiver processing subsystems. A search processor coherently processes each subpulse separately and then coherently combines their energy. A classify processor time shifts subpulses to form a continuous FM slide of maximum bandwidth and then coherently processes the full waveform. Subpulse up-slide/down-slide techniques are employed with both processors to determine Doppler amplitude and velocity.

Figure 3A:
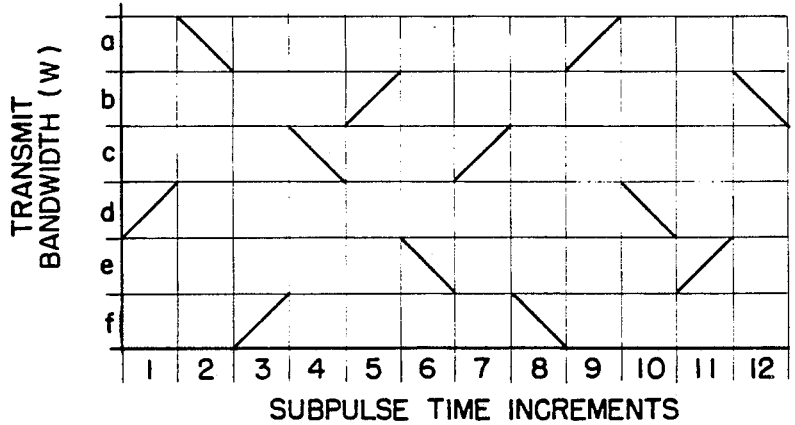
FIG. 3A shows a sequence of short time length, transmit subpulses covering an FM upslide/downslide pair for each preselected frequency subband a-f.
Figure 3B:
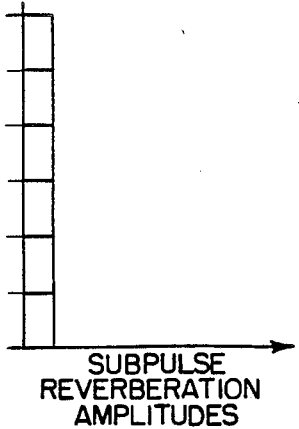
FIG. 3B shows the corresponding reverberation levels for the subpulses of FIG. 3A.

FIG. 3A shows an example using N=6 transmit subbands a–f, each covering 1/6 of total bandwidth W. The transmit sequence shown, producing the markedly low reverberation depicted in FIG. 3B, further comprises a sequence of FM up slide/down slide subpulse pairs within each subband. The start frequency of each slide and the transmit time order is randomly varied. Equal subpulse time lengths T/2N, short enough to avoid overlap of echoes from multiple major reflectors, are selected. For the example shown in FIG. 3A, which uses six sub-bands "a–f", there are 2N=12 total subpulse time increments. Just enough bandwidth is used on each slide to achieve the range resolution desired for searching. Subpulses are transmitted which together cover the system's total bandwidth. Enough subpulses are transmitted to achieve the WT product desired. For example, if the WT product desired for search is 50 and W is 100 Hz while the subpulse length to avoid multi-reflector overlap is 41.66 M sec; then 50/(100 Hz×0.04166 sec)=12. Thus twelve contiguous subpulses are required to occupy such a system's available bandwidth with minimum overlap.

Figure 3C:
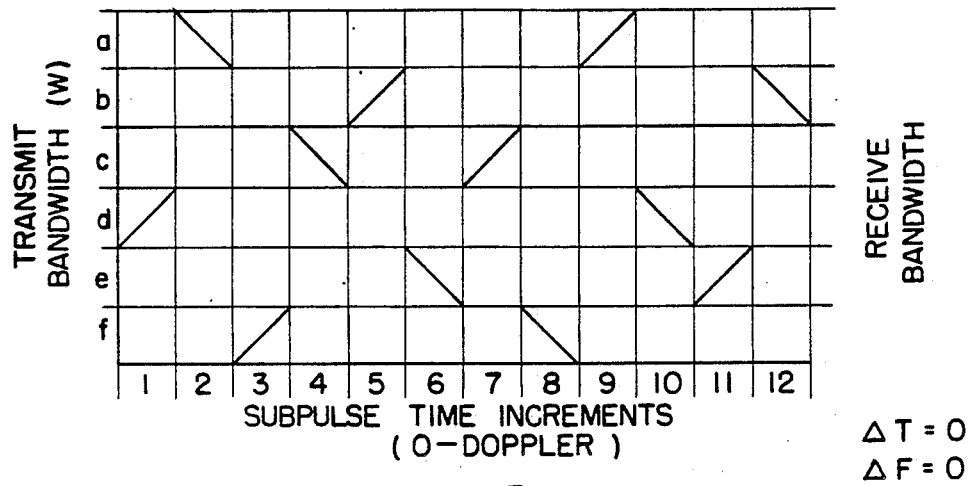
FIG. 3C shows the receive subpulses for the zero Doppler case.
Figure 3D:
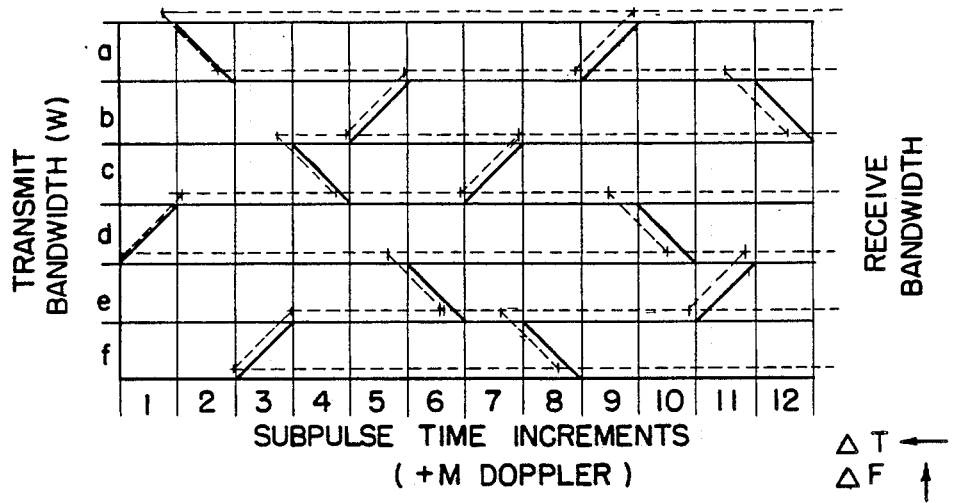
FIG. 3D shows the receive subpulses for the closing (+M) Doppler case.
Figure 3E:
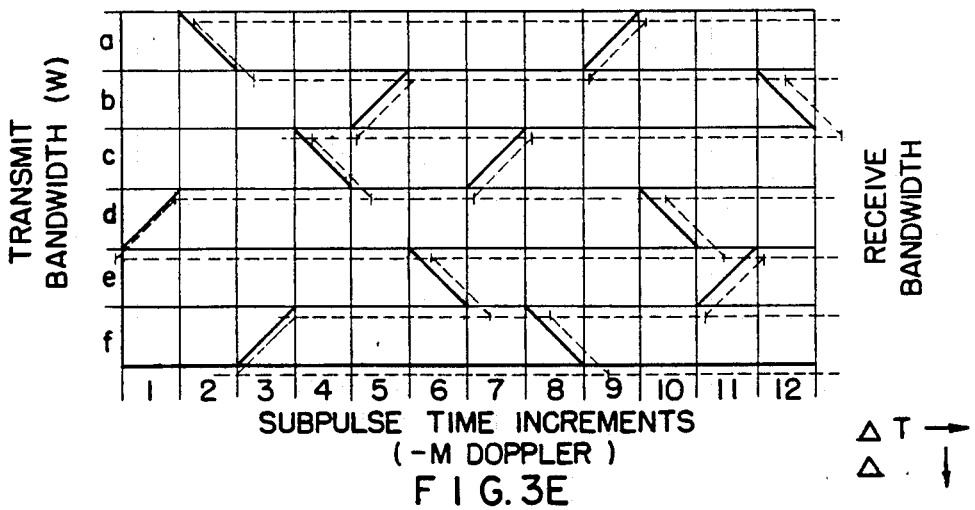
FIG. 3E shows the receive subpulses for the opening (−M) Doppler case.

FIGS. 3C, D and E represent the received subpulse echoes for the typical zero, +M and −M Doppler cases respectively. Each receive sequence is shown superposed over the exemplary transmit subpulse pattern of FIG. 3A for reference purposes. In FIG. 3C the return subpulse echoes from a stationary target do not undergo time or frequency shifts, exhibit zero Doppler velocity and therefore align exactly with the transmit subpulse sequence. FIG. 3D shows the return subpulse echoes from a closing target with a +Doppler shift having higher frequencies and a compressed time sequence. FIG. 3E shows the −Doppler case representing an opening, i.e. moving away, target.

Figure 4:
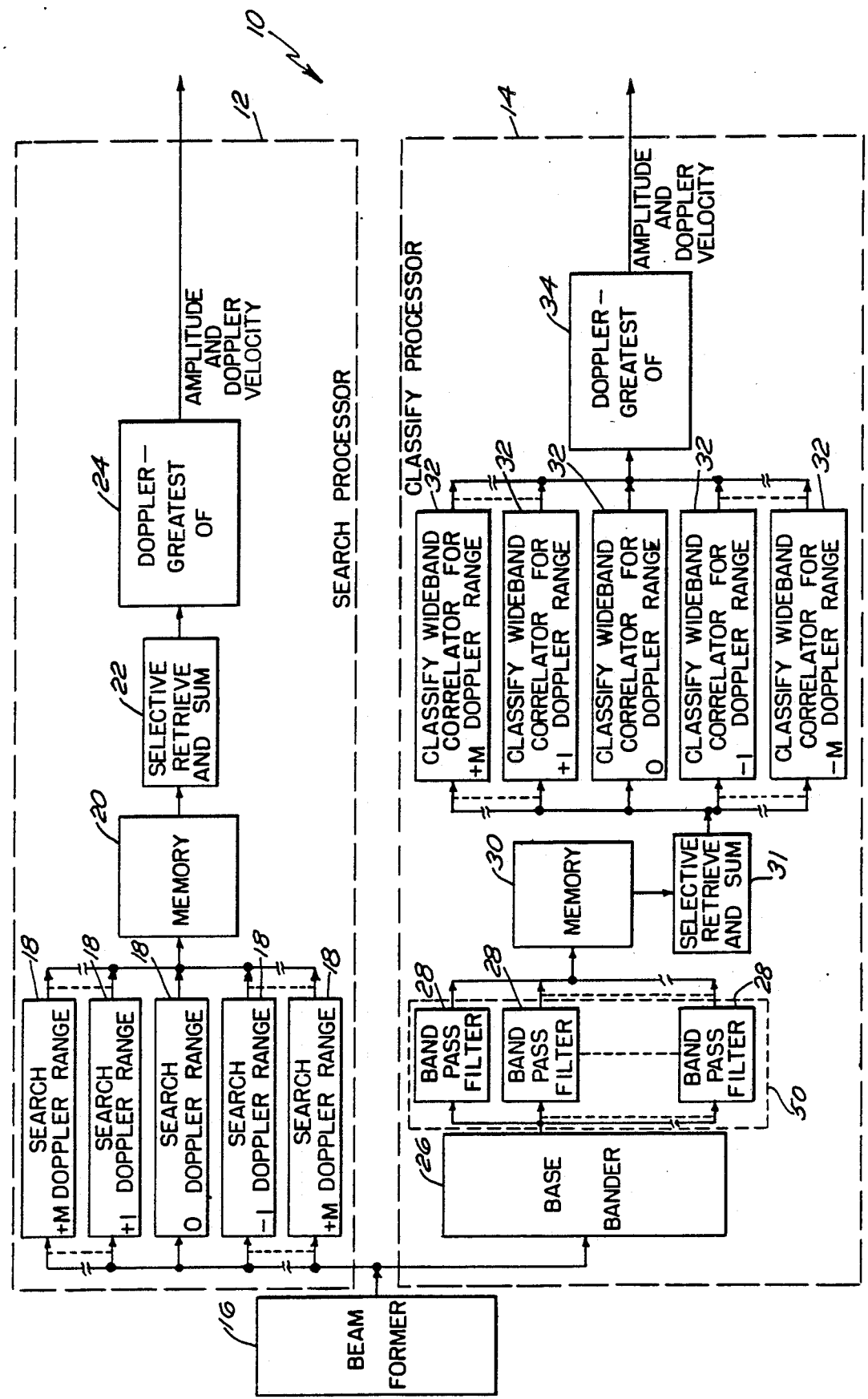
FIG. 4 shows a block diagram for the receive system of the present invention.

FIG. 4 shows the search and classify receiver system 10 of the present invention. System 10 comprises a search processor 12 and a classify processor 14, each of which simultaneously receive the directed output signal of beamformer 16 which has received from any well known transducer array means 17 the return echoes of the subpulse sequence previously transmitted well known sonar system projector. Search processor 12 further comprises a plurality of search Doppler range means 18, one each search Doppler range means 18 being dedicated to one of a preselected Doppler range 2M (−M to +M) centered about zero Doppler. The plurality of contiguous search Doppler range means 18 together cover the 2M Doppler band. Each of the search Doppler range means 18 concurrently receives the output of beamformer 16, extracts the corresponding subpulse Doppler ranges therefrom and outputs the real and imaginary components for each subpulse thereof. The real and imaginary outputs of each subpulse for the plurality of search Doppler range means 18 are stored in a time sequence in memory 20. A selective retrieve and sum 22 accesses the real and imaginary values stored in memory 20 for each subpulse as appropriate for the time and frequency variations for each Doppler range means and coherently adds all of the real values together to form a real sum and all of the imaginary values together to form an imaginary sum for the total bandwidth pulse. These real and imaginary sums are then combined to determine doppler amplitude for that pulse. Doppler-Greatest Of 24 receives the outputs from retrieve and sum 22, selects the Doppler interval having the greatest amplitude and outputs the amplitude and the Doppler velocity thereof to well known search detector means, 25, which detect therefrom the presence or absence of a sonar contact against acoustic background signals. Classify processor 14 further comprises base bander 26 which base bands the output of beamformer 16. The output of basebander 26 is received by a plurality of contiguous bandpass filters 28 with resolutions equal to a Doppler interval chosen such that the number of filters 28 covers the transmit bandwidth (e.g. 600 Hz),+or−Doppler coverage (e.g. 80 Hz), divided into the desired Doppler resolution (e.g. 4 Hz). The outputs of each bandpass filter 28 are then stored in time sequence in memory 30. A plurality of classify wideband correlator for Doppler range means 32 receive the basebanded, bandpass filtered real and imaginary values from a retrieve and sum 31 which selectively accesses the stored outputs of filters 28 in memory 30, and determine therewith the Doppler amplitude and velocity for each subpulse by correlating with a reference. A Doppler-Greatest Of 34 then receives the outputs from the plurality of correlator means 32 and extracts therefrom the highest amplitude and Doppler velocity which are then fed to well known classification analyzer means, 35, which measure parameters of the sonar contact and infer therefrom the nature/identity of the contact.

FIG. 5 shows a more detailed block diagram of a search Doppler range means 18 of FIG. 4. Means 18 further comprises a plurality of bandpass filters 44, base banders 46 and sub-band correlators 42. Subpulse outputs of beamformer 16 are simultaneously fed to each of a parallel plurality of series connected strings, each string comprising a bandpass filter 44, a base bander 46 and a subband correlator 42 respectively. Thus for search purposes, within each search Doppler range means 18, each received subpulse is independently bandpass filtered (44), base banded (46) and correlated with a reference (42). Alternately, the function of subpulse bandpass filters 44 and subpulse basebanders 46, represented by functional block 40, may be accomplished using an FFT 50 as shown in FIG. 5B. The independent correlation of subpulses avoids generation of cross products and the change in range resolution that would result from the greater bandwidth correlation involving several subpulses, contiguous in frequency. When correlating each subpulse several references are used to cover the appropriate Doppler interval. The real and imaginary outputs of all the independent subpulse correlations are then stored in memory 20. The stored values are selectively retrieved and a summation of real values from all the subpulses and a summation of imaginary values from all of the subpulses made. The real sum and the imaginary sum are then combined to determine the magnitude. This coherent summation of the outputs is carried out in selective retrieve and sum 22 for each of the preselected Doppler intervals.

Since Doppler causes either compression or expansion of time, care is taken by retrieve and sum 22 to select for summation the stored values appropriate for each Doppler interval. This then produces an individual amplitude output for each Doppler interval. An amplitude "greatest of" (24) is then used to find the highest amplitude. The Doppler interval producing this "greatest" output for that subpulse sequence is then outputted by processor 12.

FIGS. 6A and 6B are representations of a typical search signal being correlated and the corresponding reverberation amplitude in the prior art. FIGS. 7A and 7B are representations of a subpulse sequence signal being correlated and the corresponding reverberation level for the present invention.

For classification purposes, instead of base banding each subpulse individually an entire transmit band, such as a-f of FIG. 3, is base banded. Subpulses are band pass filtered, reordered to form contiguous slides, as shown in FIG. 8A and correlated with references. Each subpulse is therefore correlated with the reference of the other subpulses with the same polarity (up slide or down slide). This produces the cross products necessary to achieve the desired increase in range resolution. In coherent signal processing correlation of a signal with a reference produces an output with a time resolution inversely proportional to the bandwidth of the signal.

Since Doppler shift ($\Delta f$) is related to both frequency as well as relative speed, the shift caused by 10 kts of Doppler at 2 KHz is not the same shift caused by 10 kts of Doppler at 3 KHz. Therefore classify processor 14 is designed with several Doppler related band selection, reordering and correlation functions with references for each of the subpulses. This assures maximum performance over the Doppler interval desired. The storage, retrieval and summation of the correlator output value is similar to that employed for search. Any of a variety of well known classical techniques and modern digital techniques are available for base banding and correlation.

The transmit sequence of this invention permits separate correlation of the up slide and the down slide which can be followed by a fine measurement of Doppler as indicated by the relative time shift in the correlator outputs.

For reduction of Mutual Interference and for improved immunity to ping stealing each transmission uses a different code or sequence of subpulse start frequencies. This constant variation in the subpulse transmission sequence greatly reduces correlation ship to ship.

For increased immunity to ping stealing by an enemy ship or submarine, the present ordered transmission sequence currently employing LEFT, CENTER, RIGHT AND ODT (Omni-Directional Transmission) could be accomplished as interleaved groups of subpulses. The grouping order is randomized each transmission so that an intercepting enemy can not determine the Maximum Response Axis (MRA), transmitted beamwidth or source level of any transmitted subpulse.

Advantages of the present invention are as follows: reverberation is lowered because the transmission is spread over more of the available spectrum; resolution can be tailored between that related to correlation in the subpulse bandwidth (FIGS. 7A and B) to that related to correlation in the transmit bandwidth (FIGS. 8A and B) e.g. six 100 Hz subbands cover a 600 Hz transmit bandwidth W; both search and classify resolutions can be derived from the same ping due to parallel processing being provided. Neither process is compromised for the needs of the other; targets need not be alerted by a unique classification transmission; ping stealing is greatly hampered because of the randomization of the transmission; echoes from various major reflectors in an elongated target do not reduce the S/N of each other because the subpulses are kept very short and are deliberately spaced during transmission; and mutual interference is reduced because of the large number of combinations of subpulses (codes) available for transmission.

What has thus been described is a system for providing increased gains in detection and classification of active sonar targets while concurrently preventing target cognizance of detection. Operation starts with transmission of a sequence of FM up slide/down slide subpulse pairs, while randomly varying the start frequency of each. Subpulse time lengths short enough to avoid overlap of echoes from multiple major reflectors are used. Just enough bandwidth is used on each slide to achieve the range resolution desired for searching while enough subpulses are transmitted to cover the systems total bandwidth and to achieve the bandwidth/time product (WT) desired for searching.

Obviously many modifications and variations of the present invention may become apparent in light of the above teachings. For example: the transmit hardware, the motion of own ship during transmission time, the medium through which the transmission travels, the motion of the target during reflection, the medium through which the echo travels, the motion of own ship during reception and the receiving hardware all have an effect on the phases of the subpulses. Base banding can be accomplished by cross multiplying pairs of opposite sloped subpulses in the same band as shown in FIG. 9. This establishes a phase for the processing functions which follow. The phase of each subpulse pair will vary only slightly compared to the possible variation of the absolute phase of each subpulse. Phase consistency can be optimized by contiguous transmission of the up slide and down slide in each band. Although this alternative method of base banding greatly aids the important function of controlling variation of subpulse phase there is a loss due to the nature of the cross multiplication function. Small signals would be suppressed. This variant should be considered for application in short range, shallow water situations where submarine target echoes would be strong enough so that suppression of small signals would not be a problem. The classify processor can also employ separate base banding of portions of the total transmit band as in FIGS. 10 and 11. Through this approach the range resolution can be tailored to avoid too fine a resolution. Dividing this base banding into two portions will cause the range resolution to be half of its potential; dividing the base banding into three portions will cause the range resolution to be one third of its potential, etc.

In light of the above, it is therefore understood that within the scope of the appended claims, the invention may be practiced otherwise than as specifically described.

What is claimed is:

1. A system for providing improved, reverberation limited, target detection and classification, comprising;
   sonar transducer array means, for producing and projecting a preselected sequence of FM up slide-down slide waveform pairs at random start frequencies covering a preselected frequency range, receiving reflected acoustic echoes from said target and producing proportional electrical signals therefrom;
   beamformer means, for receiving said proportional electrical signals from said sonar transducer array means and producing a directed signal therefrom;
   search processor means, connected to said beamformer means, for receiving the output of said beamformer means and determining the maximum amplitude and Doppler velocity therefrom;
   classify processor means, connected to said beamformer means, for simultaneously receiving the output of said beamformer means, basebanding said beamformer output into a basebanded signal and determining the amplitude and Doppler velocity of said basebanded signal;
   search detector means, for receiving the output of said search processor means and detecting the presence of said target against the acoustic background; and
   classification analyzer means, for receiving the output of said classify processor means, producing measurement parameters of said target and infering the nature/identity of said target therefrom.

2. A system according to claim 1 wherein said search processor means further comprises:

a plurality of search Doppler range means covering a preselected 2M Doppler range, each of said plurality of range means outputing a Doppler value for that range, said plurality of search Doppler range means thereby producing a plurality of Doppler outputs;
   first memory means, attached to said plurality of search Doppler range means, for receiving and storing said plurality of Doppler outputs transmitted therefrom;
   first selective retrieve and sum means, connected to said first memory means, for selectively retrieving from said first memory means the output of said plurality of search Doppler range means and determining the sum therefrom; and
   Doppler-greatest of means, connected to said first selective retrieve and sum means, for receiving the outputs thereof and determining the velocity and amplitude of the greatest Doppler shift.

3. A system according to claim 2 wherein said classify processor means further comprises:
   basebander means, for receiving the output signal from said beamformer means and basebanding said output signal across the frequency band of interest;
   a plurality of bandpass filter means, for bandpass filtering the output of said basebander means producing thereby a plurality of filtered outputs, one for each preselected subband;
   second memory means, for receiving, storing and time shifting said bandpass filtered outputs from said plurality of bandpass filter means;
   second selective retrieve and sum means, for selectively retrieving from said second memory means inputs for wideband correlation appropriate for each Doppler range;
   a plurality of classify wide band correlator for Doppler range means, for receiving the output of said second selective retrieve and sum means and determining amplitude and the Doppler velocity for a preselected 2M Doppler range;
   a second Doppler greatest of means, connected to said classify wide band correlator for Doppler range means, for receiving said 2M outputs therefrom and determining the maximum amplitude and Doppler velocity therefrom.

4. A system according to claim 3 wherein each said plurality of search Doppler range means further comprises:
   a plurality of subpulse bandpass filters, connected to said beamformer means for bandpass filtering the output thereof into preselected subbands;
   a plurality of subpulse basebanders, one each connected to one of said plurality of subpulse bandpass filters, for receiving the outputs of said subpulse bandpass filters and individually basebanding said outputs; and
   a plurality of subband correlators, one each connected to one of said plurality of subpulse basebanders, for receiving said basebanded subpulses and correlating said signals.

5. A system according to claim 4 wherein said plurality of subpulse bandpass filters and said plurality of subpulse basebanders further comprise an FFT.

* * * * *